United States Patent [19]

Laws et al.

[11] Patent Number: 5,033,926
[45] Date of Patent: Jul. 23, 1991

[54] HEAT RETAINING MEANS

[75] Inventors: William R. Laws, Worcester Park; Geoffrey R. Reed, Tadworth, both of Great Britain

[73] Assignee: Encomech Engineering Services Limited, Epsom, England

[21] Appl. No.: 449,142

[22] Filed: Dec. 13, 1989

Related U.S. Application Data

[60] Continuation of Ser. No. 150,282, Jan. 29, 1988, abandoned, which is a division of Ser. No. 794,674, Nov. 4, 1985, Pat. No. 4,736,608.

[30] Foreign Application Priority Data

Nov. 7, 1984 [GB] United Kingdom ............... 8428129

[51] Int. Cl.⁵ .................................... F27D 3/00
[52] U.S. Cl. ................................ 414/154; 414/147; 414/159; 432/239; 432/254.1; 432/65; 72/200
[58] Field of Search ............... 414/147, 154, 159; 432/253, 254.1, 261, 245, 246, 242, 244, 239, 247

[56] References Cited

U.S. PATENT DOCUMENTS

| | | | |
|---|---|---|---|
| 1,597,401 | 8/1926 | Cope | 414/154 |
| 4,087,333 | 5/1978 | Naevestad | 414/147 X |
| 4,147,506 | 4/1979 | Southern et al. | 432/254.1 X |
| 4,303,388 | 12/1981 | Elhaus | 414/159 X |
| 4,314,790 | 2/1982 | Metz | |
| 4,421,481 | 12/1983 | Holz et al. | 414/154 X |
| 4,452,587 | 6/1984 | Laws et al. | 432/65 X |

FOREIGN PATENT DOCUMENTS

| | | |
|---|---|---|
| 0287021 | 10/1988 | European Pat. Off. |
| 2900497 | 3/1980 | Fed. Rep. of Germany |
| 3132373 | 7/1982 | Fed. Rep. of Germany |
| 61201 | 4/1983 | Japan ............... 432/239 |
| 16212 | of 1915 | United Kingdom ............... 414/154 |

OTHER PUBLICATIONS

Patent Abstracts of Japan, vol. 7, No. 50 (M197)(1195), Feb. 26, 1983; JP-A-57 199 553 (Mitsubishi), 12/07/1982.
Patent Abstracts of Japan, vol. 7, No. 291 (M265)(1436); Dec. 27, 1983, JP-A58-163 505 (Nippon Kokan), 09/28/1983.

Primary Examiner—Frank E. Werner
Attorney, Agent, or Firm—Cushman, Darby & Cushman

[57] ABSTRACT

Screens for limiting heat losses from heated material, e.g. bars and slabs in rolling mills. Screens are provided in the form of strings of heat insulating bodies composed of metal shells containing insulating material. These screens may form curtains and/or covers for the hot material. Containing chambers for the hot material may be provided with such strings of elements and the chambers may also comprise structure for limiting heat conduction losses through the material supports therein. The screens may be collapsed over the hot material thereby completely surrounding and insulating the material from loss of heat. A displaceable chamber installation may also be provided for limiting heat loss when holding and transferring hot material between processing stages.

16 Claims, 9 Drawing Sheets

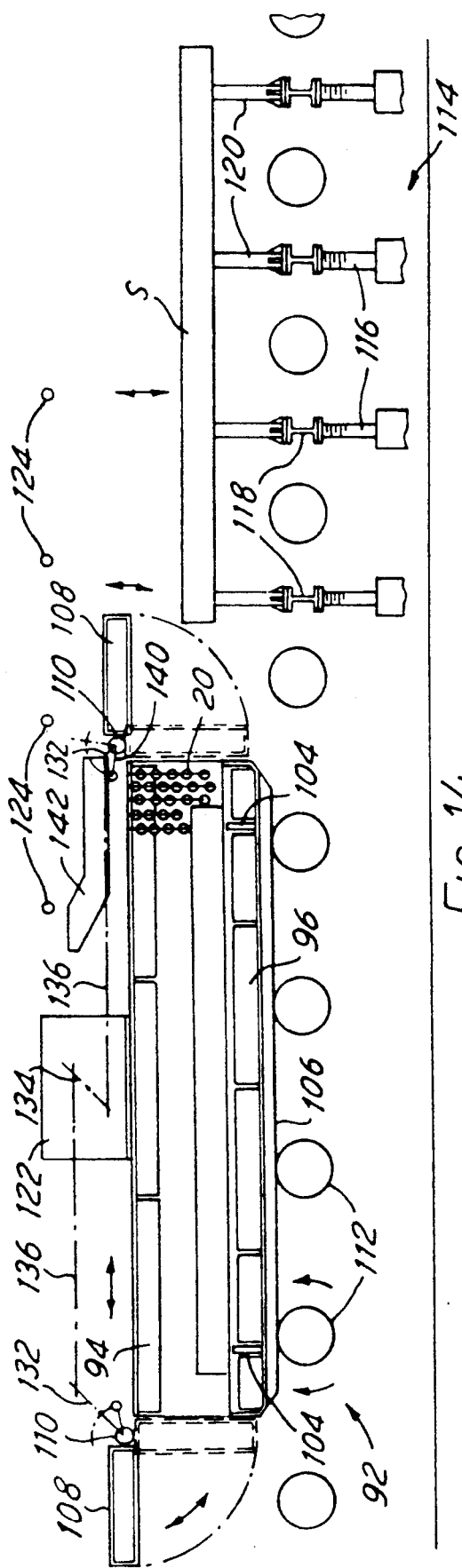
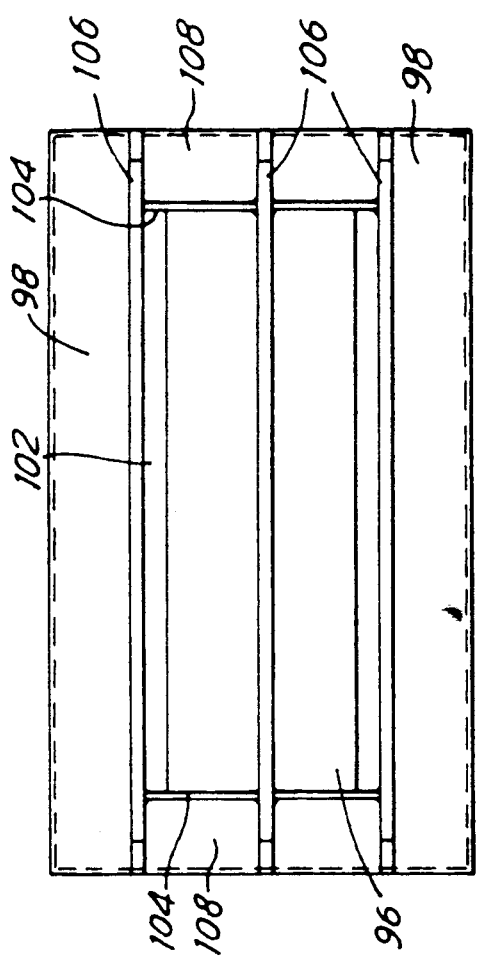
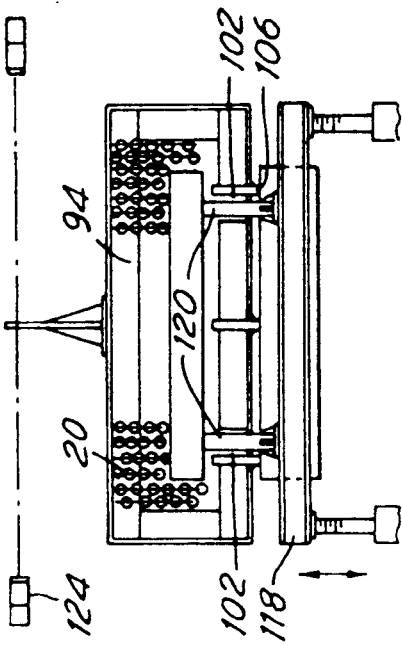
FIG.14
FIG.16
FIG.15

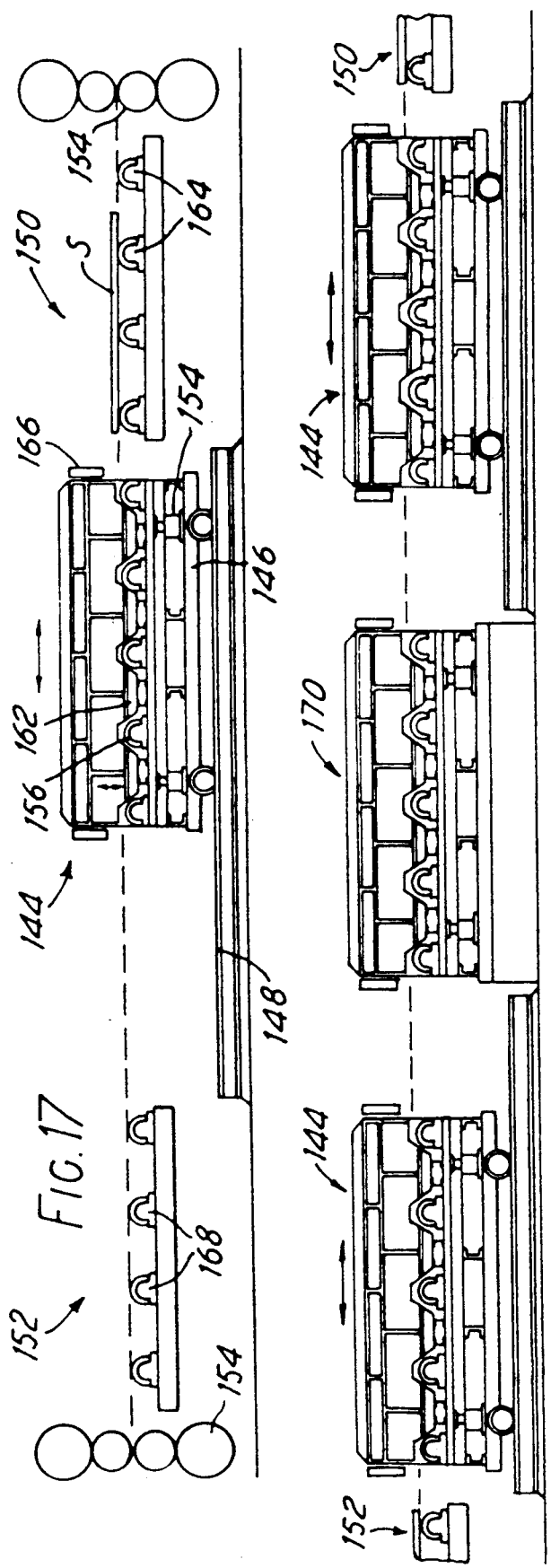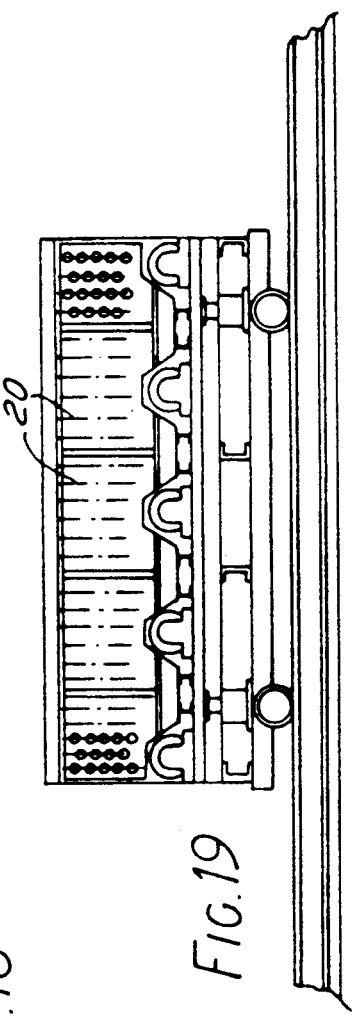

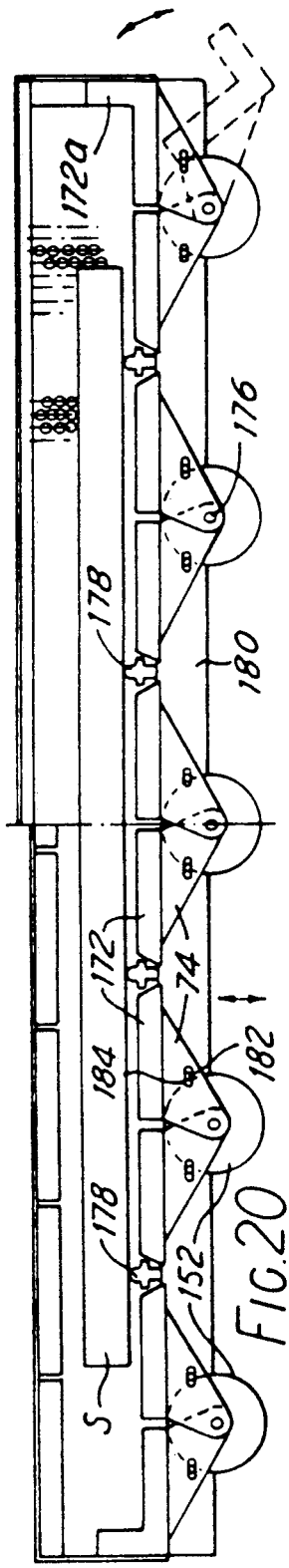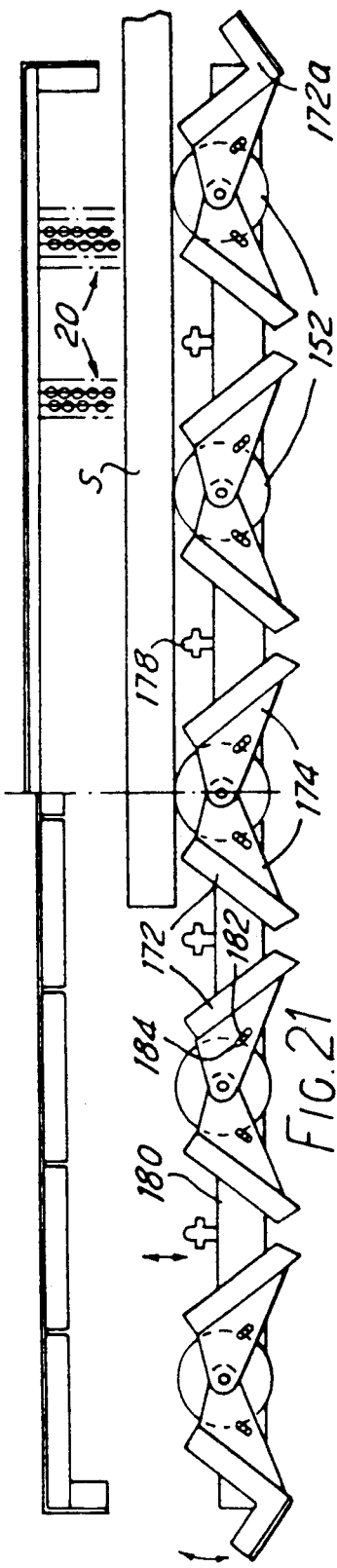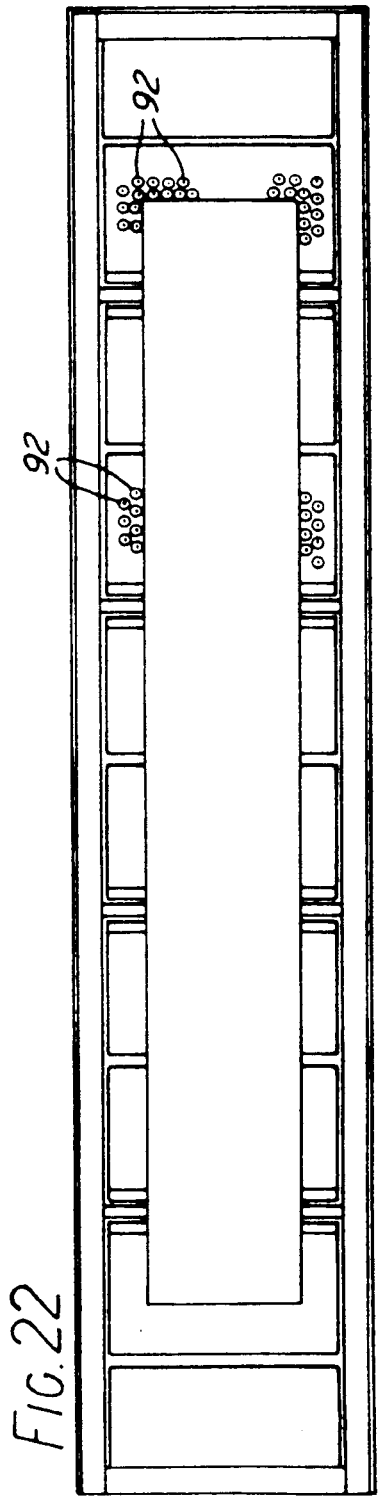

HEAT RETAINING MEANS

This is a continuation of Application Ser. No. 07/150,282, filed Jan. 29, 1988, which was abandoned upon the filing hereof, which was a division of applin. Ser. No. 06/794,674 filed Nov. 4, 1985, now U.S. Pat. No. 736,608 issued Apr. 4, 1988.

BACKGROUND OF THE INVENTION

This invention relates to the provision of means for and a method of reducing heat losses when handling hot material. It is particularly concerned with such means and methods of reducing heat loss from material continuous casting plant and in hot-rolling mills, e.g. from metal slabs and sections, but is applicable to other installations and not only in metal processing industries.

The use of heat-reflecting panels to reduce heat loss is known, but such panels have limitations, particularly in their use as upper and side boundaries of an enclosure. It is known that the efficiency of heat insulation falls as the space between the hot material and the enclosure walls increases, but in most practical applications a rolling mill is required to deal with a large range of sizes of material so that there is an inevitable loss of efficiency when handling sections smaller than the largest for which the installation is designed.

Efficient heat-insulating panels, such as are described in GB 1 603 428, are relatively fragile and protective measures need to be taken if they are to be disposed close to the path of the material in a hot rolling mill. The additional cost and complication of these measures are only justified by the fact that damage to the hot faces of the panels can result in considerable financial loss having regard to the operating costs of modern hot-rolling mills.

The known panels have been used to form tunnel-like enclosures along the material path through the rolling mill, the heat losses at the ends of the tunnel being unimportant if the path is occupied by moving material for most of the time. They would be less effective if they were to be used to limit heat losses from a static slab or billet near one or both ends of the enclosure, when losses through those ends will be significant.

SUMMARY OF THE INVENTION

According to one aspect of the present invention, there is provided a heat-insulating screen for reducing the heat loss from a mass of hot material, such as a metal slab or bar, said screen comprising strings of dependent elements, said elements comprising hollow, preferably metallic, bodies containing heat-insulating material, said elements being grouped to form a heat-insulating curtain or covering for the material.

A screen according to the invention may form part of a primary enclosure, or it may form a supplementary means of heat insulation within an enclosed chamber, especially for the ends and side regions of the material.

According to another aspect of the invention, therefore, there is provided a heat-insulating enclosure comprising a cover or hood provided with at least one flexible screen comprising strings of heat insulating elements, said strings being attached to the cover to depend therefrom and form a heat shield for the hot material within the enclosure.

While the use of a screen of said elements in an enclosure is able to reduce the problems described above, there may be other applications in which the elements can be utilized without being connected in strings, or where strings of elements can be used without a surrounding enclosure, and such possibilities are also within the scope of the present invention.

If such a screen is used to close off the end of an enclosure, a series of strings of elements can be hung from the upper edge of the end opening, the numbers of said bodies in said strings and their dispositions being such that they at least substantially close off any direct heat radiation from the interior of the enclosure but are able to be freely swept aside by the material entering or leaving the enclosure since they are freely suspended. For the connection of the elements into strings and their suspension, flexible means may be used in the form of temperature-resistant metal wires, cables or chains each of which has a number of said bodies at spaced intervals along its length.

It may be mentioned here that a further difficulty in preventing heat loss occurs in current rolling-mill practice because it is common for hot slabs or sections of steel (or other metals) to be required to be transported, e.g. using roller conveyors, between different stages of processing, as for example the transfer of such masses from continuous casting machines to other processes such as rolling or re-heating and/or to be temporarily held in readiness for a further process. Transfer times between processes can be long enough for the material to cool significantly with a consequent loss of energy particularly at the edges and corners which may either have to be replaced by further heating or which may cause edge cracking problems.

While it has been possible to avoid any substantial heat losses during the final rolling stages of hot metal strip by the use of stationary close-fitting insulating enclosures, such as are disclosed in EP 5340, these enclosures cannot be utilized effectively to reduce heat losses from thick bars or slabs in normal methods of operation. The enclosure must be filled with hot material for at least a quarter of the time in order to bring the faces of the insulating panels exposed to the material up to temperatures at which the heat loss from the hot material is sufficiently reduced to achieve real economies. Thus, such stationary systems can be used to good effect on rolling-mill delay tables where, as a typical example, bars 70 m long and 25 mm thick each have a residence time of about 1.5 minutes and the intervals between successive bars is not much greater, e.g. about 2 minutes. In the transfer of cast slabs to the first stage of the rolling, however, the residence time of the slab on any part of the roller table in a typical example may be 5 seconds, with a gap of over 3 minutes between successive slabs, i.e. the residence time of the slab in any part of a delay table is less than 5% of the total, and a stationary insulating tunnel would be ineffective in reducing heat loss.

According to a further aspect of the present invention, there is provided means for controlling heat loss from a heated mass of material such as a metal slab or bar, comprising a displaceable chamber forming a heat-insulating enclosure for the material, means being provided for insertion and removal of the material through at least one end of the chamber and for substantially closing said at least one end to limit heat loss therethrough, and means for supporting the material in the chamber raised above an insulating bottom wall or floor thereof.

Said chamber may be provided with a roller table section for supporting material during its insertion and removal, and in that case the means for supporting the material in a raised position can also lift the material from said roller table section. In an alternative form of chamber, at least one slot is provided in the bottom wall or floor of the chamber extending away from said at least one end for receiving support means transferring material into and out of the chamber. The support means may comprise a series of lifting members at a fixed station and arranged in a row or rows corresponding in position to said at least one slot to be received therein as the chamber is moved into said station to receive and/or deposit the material. In this form, the invention may be employed in an installation that comprises loading and unloading stations, each provided with a respective series of said lifting members, at least one said chamber and means for displacing said chamber between said stations.

In a still further aspect, the invention provides a method of limiting heat loss from a heated mass of material, such as a metal slab or bar, wherein the material is inserted into an insulated chamber through an access opening at one end, said end of the chamber being closed by heat-insulating means after said insertion to reduce radiation heat loss from the material in the chamber, the material being held in the chamber in a raised position above a floor of the chamber by supporting contacts at a plurality of small cross-section regions of its bottom face to limit heat loss by conduction.

The invention may also provide a heat-insulating chamber for use in this method of limiting heat loss, which comprises displaceable heat-insulating means at least at one end permitting the insertion and removal of the material onto and from a receiving support at the bottom of the chamber, and means are provided for lifting the material in the chamber to a raised position above said receiving support, said means comprising upwardly displaceable contacts for a plurality of small cross-section regions of the bottom face of the material arranged to limit heat loss from the material by conduction.

To inhibit the radiation of heat from said end or ends of the chamber, displaceably mounted thin-walled heat-insulating panels may be provided as closure means, said panels conveniently being of an analogous construction to the chamber walls. In a preferred arrangement, however, flexible screens are provided, comprising strings of heat-insulating elements as aforesaid, which are deflected by the material as it enters and leaves the chamber.

Such screens may be used additionally or alternatively in the interior of the chamber to reduce the free space between the material and the insulating means surrounding it, and they may also be used with heat-insulating installations other than a displaceable chamber. For example, they may form free screens around a machine such as a forging press or a flexible door for a reheating furnace, and there are also useful applications outside the metal-working industry, e.g. in glass and ceramics manufacture, for such heat-insulating means.

The invention will be described in more detail by way of example with reference to the accompanying diagrammatic drawings.

BRIEF DESCRIPTION OF THE DRAWINGS

FIGS. 14 and 15 are a longitudinal sectional view and an end view respectively of an installation comprising a displaceable chamber and a loading/unloading means according to the invention, FIG. 16 is a view of the chamber on the arrow X in FIG. 14, FIGS. 17 and 18 illustrate two alternative installations according to the invention, FIG. 19 is a transverse sectional view of a further enclosure according to the invention, FIGS. 20 and 21 are longitudinal sectional views illustrating a modified form of chamber according to the invention in two different states, the figures also being composite views with a further modification indicated in the right-hand half of each figure showing a novel form of heat-insulating screen or covering according to the invention, FIG. 22 is an internal plan view of the chamber in FIGS. 20 and 21.

DESCRIPTION OF THE PREFERRED EMBODIMENTS

Figure 1:
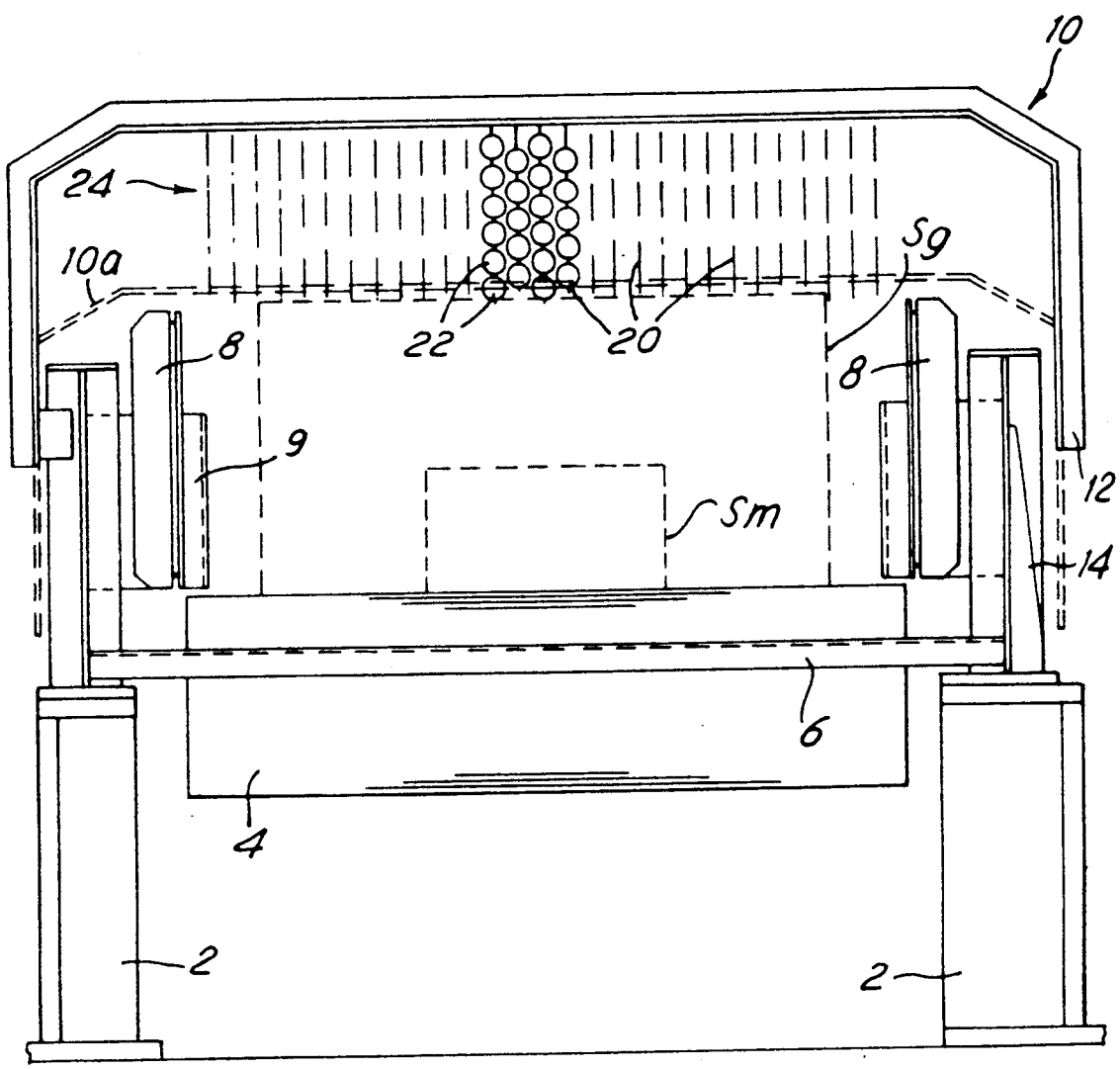
FIG. 1 is a transverse sectional view of a roll stand approach table provided with heat-insulating means in accordance with the invention.

FIG. 1 illustrates a roughing mill approach table in which a base structure 2 supports a roller table 4 with heat-insulating panels 6 in the gaps between successive parallel rollers. Side insulating panels 8 are also present, with bumper bars 9 or the like protecting them from impact by material passing along the table, and there is an insulating hood or cover 10 which has sides 12 overlapping the side panels. The cover is mounted on side supports 14 through hydraulic jacks (not shown) that can move the cover between the raised position shown in full lines and the broken-line lowered position indicated by reference 10a. The table 4 may be required to hold hot steel billets of varying sizes (projected maximum and minimum cross-sections are indicated at Sg and Sm) for varying periods before they are passed through the roughing rolls.

Suspended from the inner face of the cover and over an area somewhat larger than the plan area of the largest billet Sg, are strings 20 of elements 22 forming a heat-retaining screen 24 over the hot material. These elements are arranged so as not to impede the movement of the billet onto and off the table when the cover is raised, but surround the billet on the table closely when the cover is lowered. At the entry and exit ends (not shown) of the table the heat-insulating enclosures may be complemented by further rigid panels displaceable in a similar manner to that described below in further examples to give free passage for billets to and from the table, or the strings of elements in the entry and exit region may be extended to depend to the level of the table or below to form curtains in front of or behind the billet. It is, of course, possible to provide both these means of insulation at the ends of the table: in general the provision of a walled enclosure around the top, sides and ends of the hot material in addition to any strings of heat-insulating elements has the advantage that convection heat loss through the screen can be minimized.

The heat-insulating elements 22 are made up of thin-walled bodies filled with a high-grade insulation, e.g. of ceramic fiber. These bodies are threaded onto braided temperature-resistant metal cables or chains to form the strings and the groups of strings together make up the moveable or flexible screen or covering closely surrounding the hot material.

Figure 2:
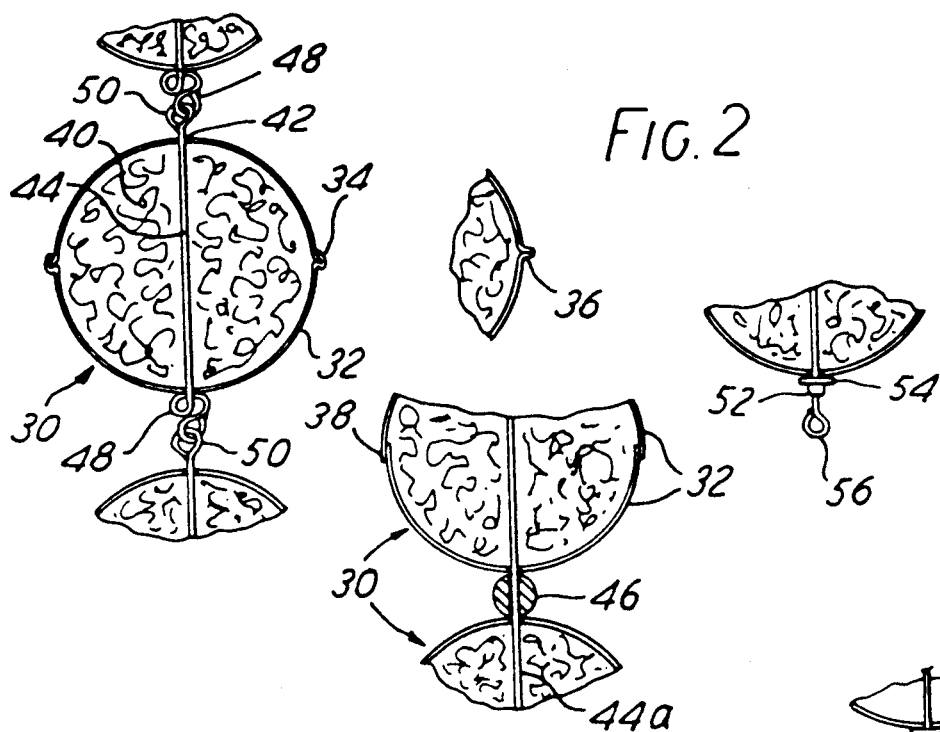
FIGS. 2 to 8 illustrate examples of the construction of strings of heat-insulating elements according to the invention.

FIG. 2 illustrates such bodies 30 formed from two hemispherical shells 32, joined alternatively by swaging 34, welded flanges 36 or spot-welded or riveted overlapping rims 38, filled with a pre-compressed ceramic fibre packing 40. The bodies have top and bottom apertures 42 for the suspension cable 44. The string of elements can be formed on a continuous length of cable 44a, with separating beads 46 between the bodies. Alternatively, the elements can be individually connected to each other, preferably releasably. In one example, the lower end of the cable is formed with a support spiral bend 48 and the upper end is formed with an eye 50 for attachment to the cable of the next element. In another example the lower end of the cable has a swaged portion 52 to hold a washer 54 on which the element rests and an eye 56 is formed below the swaged portion to attach the cable of the next element.

Figure 4:
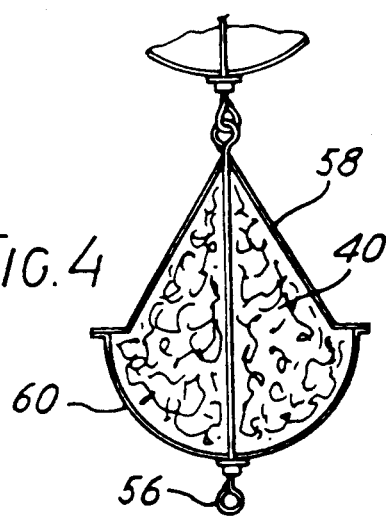
Figure 3:
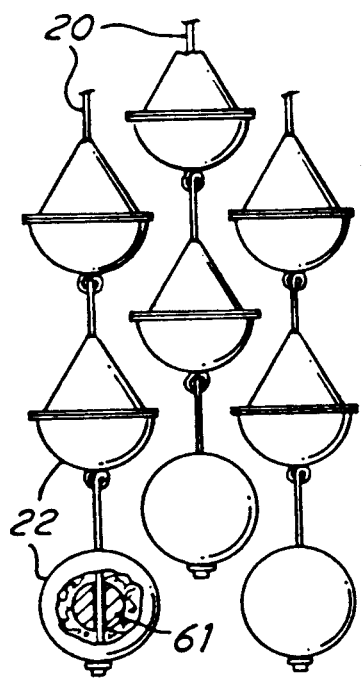
Figure 5:
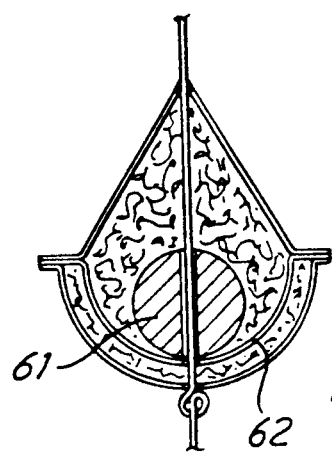

The outer shells must be formed from a material with suitable resistance to high temperatures, but as an economy the upper surfaces of the bodies which are largely shielded from direct heat radiation from the hot material can be of a lower grade alloy. In the example of FIG. 4 the conical upper shell half 58 is made of a lower grade alloy than the hemispherical lower shell half 60.

The lowermost one or more of a string of elements can contain a solid metal mass 61 which helps to keep the string 20 at its maximum possible extension and also acts as a thermal store. It is also possible to provide inner walls or membranes 62 within the external shell.

Figure 6:
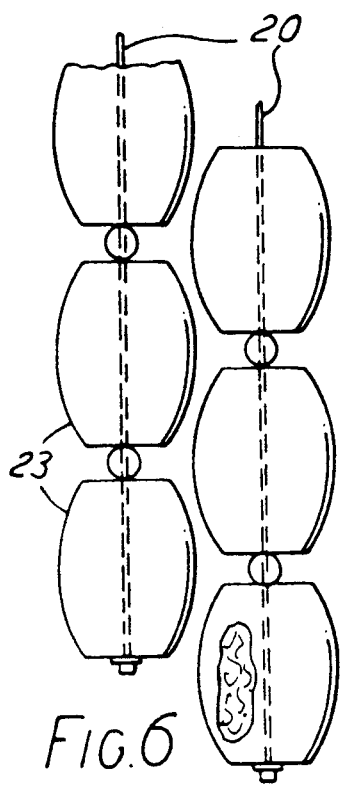
Figure 7:
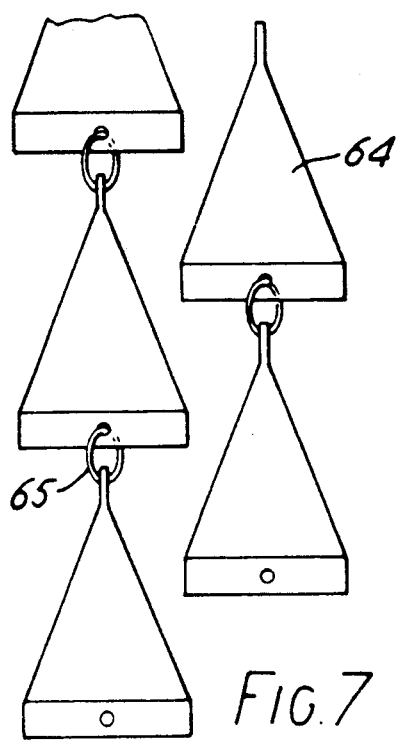
Figure 7A:
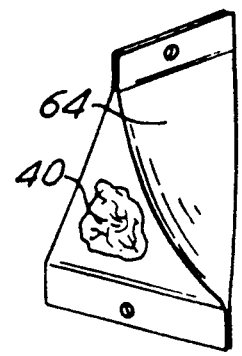

FIG. 6 illustrates strings 20 composed of barrel-shaped elements 63, while FIGS. 7 and 7a illustrate a particularly simple design of element with four-sided or tetrahedral bodies 64 that can be produced from a continuous length of tubing, connected together by rings 65.

Figure 8:
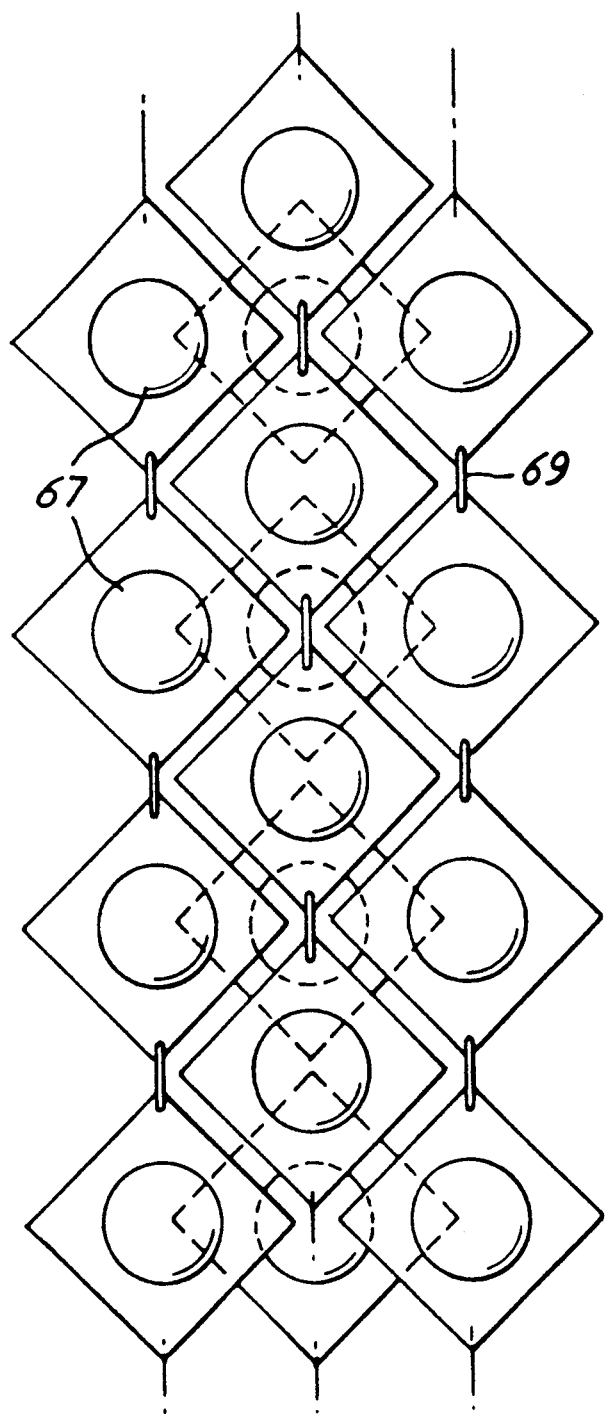
Figure 8A:
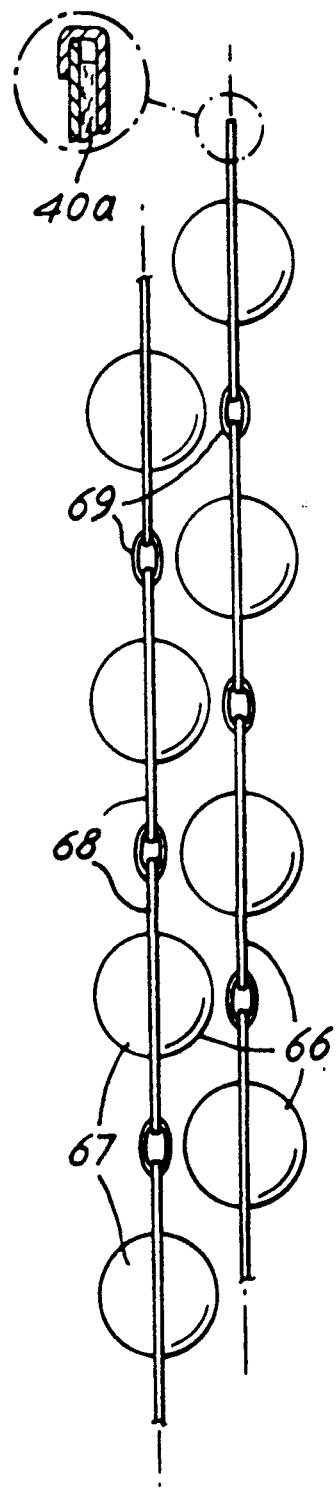

FIGS. 8 and 8a illustrate a further modified configuration being a development of the spherical elements illustrated in FIG. 2. It had been found that for the most effective insulation against thermal radiation, the elements should collapse closely against each other when they hang freely and form a screen of several layers. By forming each element as an insulating body with projecting metal fins, this condition can be fulfilled and a given standard of thermal insulation can be obtained with the use of fewer elements. Also, rectangular metal blanks can be used, thereby reducing wastage to make better use of the metal from which the elements are formed.

In the example of FIGS. 8 and 8a, square sheet metal blanks have hemispheres pressed in them and each element 66 is formed by a pair of pressed blanks placed back to back, the hemispherical depressions providing a hollow sphere 67 that is filled with insulating material, as already described, and the two parts being secured together at their margins, e.g. by spot welding, which form rectangular fins 68. A ceramic fiber paper 40a may be sandwiched between the margins of the two parts forming the fins so that the fins themselves have heat-insulating properties; in this form, instead of spot welding the two parts are secured together and the ceramic fiber enclosed by bending the edges of the fins one over the other to form a clinched seal. Each element has holes drilled in diagonally opposite corners so that heat-resistant connecting rings 69 can connect adjacent elements to form the vertical strings. By forming a multiple layer screen in which the strings of succeeding layers are placed behind each other in laterally staggered relation, as is indicated in FIGS. 8 and 8a, it is possible with as few as two layers to form a screen that substantially stops direct radiation loss from a workpiece. Additional layers can be provided to give the desired insulating properties.

It is of course possible to provide such elements with other than spherical insulating portions, but generally parallelogramic sheet metal blanks will be preferred to get the maximum use from the material without wastage. It is to be understood, however, that individual features of the heat-insulating elements described can be adapted interchangeably, so that for example the tetrahedral bodies of FIGS. 7 and 7a and the finned spherical bodies of FIGS. 8 and 8a can be formed with the different upper and lower shell materials described with reference to FIG. 4.

Figure 9:
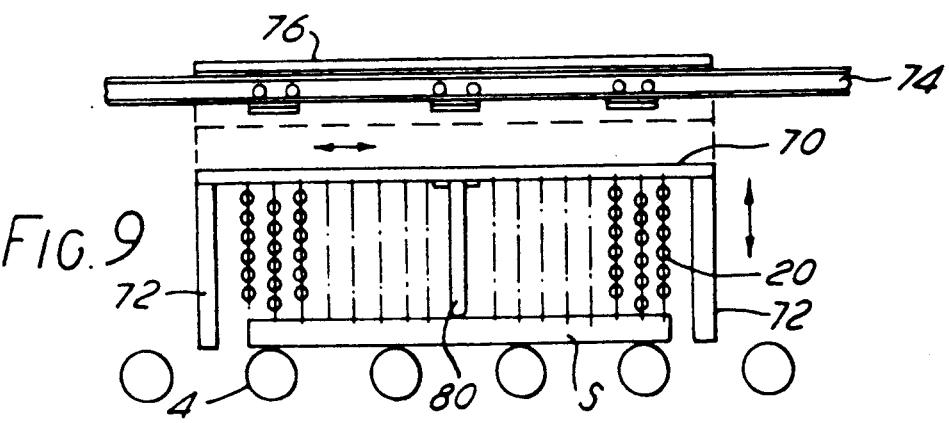
FIGS. 9 and 10 are side and end views respectively of a heat-insulating enclosure according to the invention.
Figure 10:
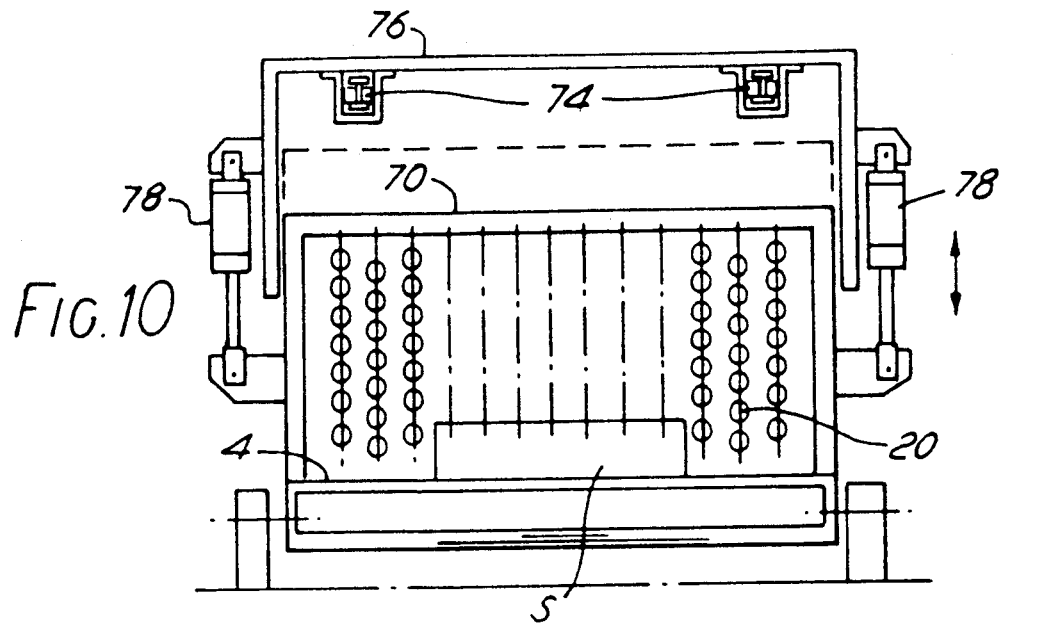

FIGS. 9 and 10 illustrate an enclosure analogous to that already described with reference to FIG. 1 in that a cover or hood 70 with end walls 72 and heat-insulating strings 20 suspended from its internal top face is mounted over a roller table 4 to enclose a slab S of hot material on the rollers. The drawing shows the cover suspended from overhead rails 74 through a carrier 76, so that jacks 78 between the cover and the carrier can move the cover upwards when a hot slab is to enter or leave the roller table 4, and then lower it so that the elements on the strings completely surround and insulate the slab against heat loss. The cover and carrier can move as a unit on the rails 74 longitudinally of the roller table so that the material can be protected from heat loss as it moves along the roller table. FIG. 9 also shows a probe 80 fixed to the cover which contacts the slab to limit the downwards movement of the cover: it can be arranged that the frictional force between the probe and the slab is sufficient to ensure that the cover and slab move together along the roller table.

Figure 11:
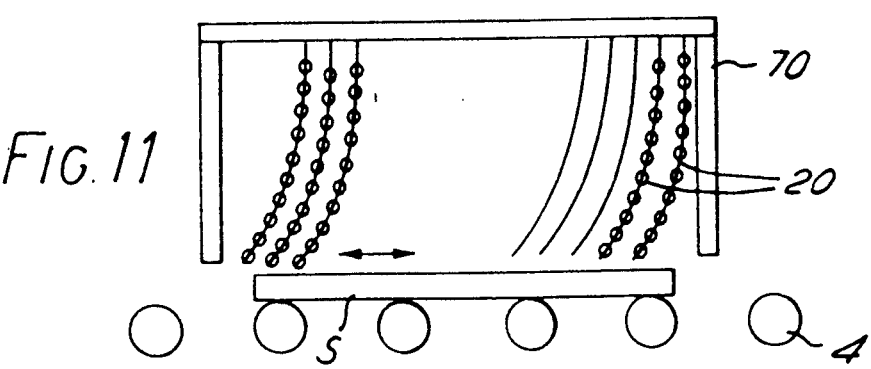
FIG. 11 illustrates a mode of operation of the enclosure of FIGS. 9 and 10, FIGS. 12 and 13 illustrate modifications of a heat-insulating enclosure within the scope of the invention.
Figure 12:
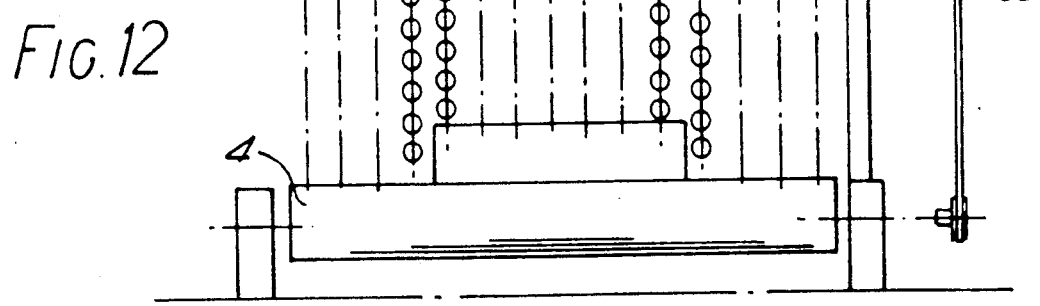

If the hot material is to be held on the roller table for some minutes it is necessary to move it to and fro on the rollers. If the strings 20 are sufficiently long, it may be possible for them to be swayed to and fro by their contacts with the slab, as is indicated in FIG. 11, without increasing in any significant way the heat loss. Alternatively, the cover as already described with reference to FIGS. 9 and 10 can be arranged to oscillate in synchronism with the slab, whether by entrainment through the probe 80 or by a positive drive as is exemplified in FIG. 12. FIG. 12 illustrates a drive chain or belt 82 from the roller table 4 to a clutch 84 which can transmit the drive to a rack and pinion mechanism 86 the rack of which is mounted on the cover. The clutch is disengaged while the roller table is operating in its normal through-pass mode but is engaged by an automatic interlock (not shown) when the table is in a hold mode so that the material and the cover will then oscillate together. The interlock with the roller table drive can also be used to ensure that the cover can only be lowered (as by the means shown in FIG. 10, for example) when the roller table hold mode has been selected.

By way of further illustration of possible modifications, FIG. 12 shows a top cover or hood 88 that relies wholly on the screens formed by the strings of elements to enclose the edges of the hot material, and as there are no rigid heat-insulating entry and exit panels, the cover is mounted directly on the rails 76, being fixed in position other than for the oscillatory movement it can be given.

Figure 13:
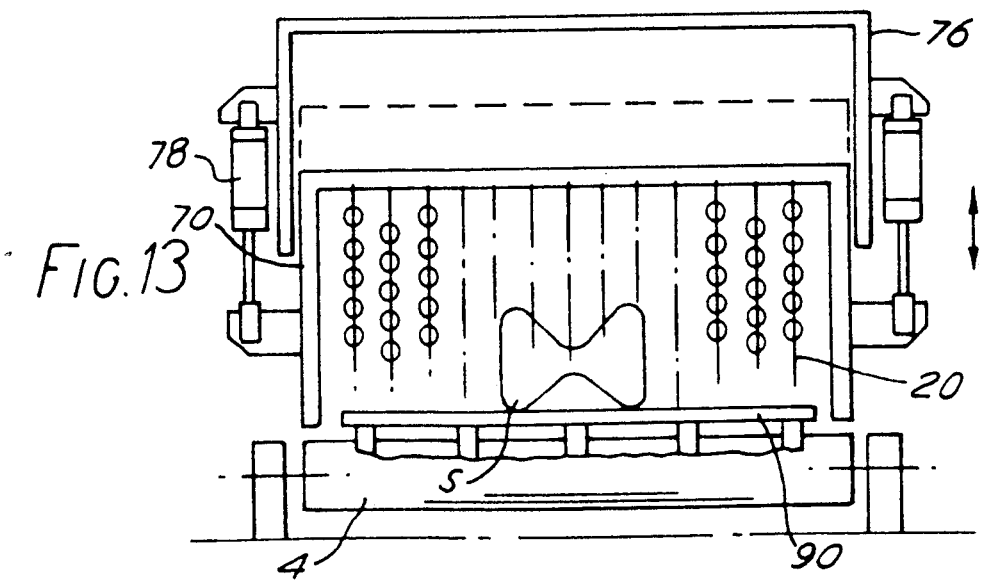

The arrangement illustrated schematically in FIG. 13 is generally similar to that in FIG. 10 but there is shown one of a number of insulated beams 90 that can lift the hot material from the rollers and into the strings 20 of insulating elements. It will be noted that this measure can be employed either with or without the raising and lowering of the cover 70.

The provision of strings of insulating elements within an insulated enclosure can minimise a problem that occurs with particular sections of material, such as thick slabs. To explain this point further, whereas the heat loss from a thin bar will be mainly from the upper and lower surfaces, as the thickness increases the heat losses from the edges of the bar become more significant and can produce undesirable temperature gradients with "cold" edges developing that cause edge rolling problems in later processing. The strings of insulating elements act as a passive insulating system which is inexpensive to produce and install as compared with the known methods of using oxy-fuel burners or induction heaters to prevent a metal slab developing "cold" edges.

The strings can be packed relatively densely and still be freely displaceable to allow a slab to pass through the screens of elements which simply reform when the slab has passed through them. The close proximity of the elements, which may or may not be in direct contact with the slab, results in the metal outer shells of the elements re-radiating heat as they quickly rise to a temperature close to that of the slab and the heat interchange between the adjacent surface of the slab and the elements is then substantially less than if the slab were allowed to radiate freely to the internal walls of the chamber.

To perform their function for protecting the edges and ends of a slab, strings of elements would be confined to the peripheral regions of a chamber, forming a screen beyond the edges of the hot body and a covering for the marginal regions of the body adjacent to the edges. It has already been mentioned that it is also possible to deploy them as a complete covering (contacting or non-contacting) for the whole upper surface of a hot body. This function might be employed to reduce the heat loss for irregularly shaped bars or billets to enable them to be held at a temperature either between rolling operations or during forging, whether or not such material is located in an enclosed chamber. The strings of elements may be arranged to be raised and lowered, as by the jacks 78 shown in FIG. 13, so that in the event of a stoppage they could rest on the material and form a contacting covering that conforms to its shape.

Where the material is being held on a roller table it is preferably arranged that in the event of a prolonged delay the material can be lifted from the rollers by lifting means as already described. For such arrangements as these, an interlocked control system may be provided so that the insulating screen or covering cannot be lowered unless the rollers are stationary and the rollers cannot be re-started until the screen is lifted.

FIGS. 14 to 16 illustrate an application of the invention in alternative aspects to an existing hot-rolling mill for transferring hot material between two stations while making use of the roller tables already there. To receive a heated metal slab or billet, a displaceable chamber 92 is provided comprising top, bottom and side walls 94, 96, 98 composed of a series of heat-insulating panels, each comprising a thin-walled metal casing with a core of insulating material similar to that described in GB 1 603 428, although other constructions can be used. Strings 20 of insulating elements are also shown in FIG. 14, but this is not an essential feature. The bottom wall of the chamber is made up of three narrow rows of panels, as can be seen in FIG. 15, extending parallel to each other with small gaps 102 between the centre row and each side row. The centre row of panels is interconnected structurally with the side row by transverse bridge pieces 104. Mounted on the underside of the bottom wall are skids 106 through which the chamber can rest on the roller table. At opposite ends of the chambers are doors 108 with hinges 110 at their upper edges that allow them to be raised when a heated slab S is to be placed in or removed from the chamber. With the end doors closed, heat losses from the slabs are minimised by the heat-insulating enclosure which rapidly reaches an equilibrium temperature with the slab because of the low thermal mass of the chamber interior construction.

The chamber is intended to be used on an existing roller table 112 of a hot-rolling mill and can be moved along the table by conventional drive means (not shown) to transport the slab between successive processing stations.

Loading of the slab into the chamber is carried out at a fixed transfer station 114 (FIG. 14) at which are an assembly of slab lifting jacks 116. As indicated to the right of the chamber in FIG. 14, and in FIG. 15, the jacks are arranged in pairs, each pair bearing the opposite ends of a transverse beam 118 from the upper surface of which projects support pins 120 of low thermal mass that have a minimum cross-section to limit heat conduction, the slab being supported on said pins at the loading station. To insert the slab into the chamber, the jacks 116 are extended to raise the slab to the level of the space within the chamber and the chamber, with its hinged end doors raised, is moved along the roller conveyor 112 into the loading station 114. The pins 120 are so placed that as the chamber enters the loading station they register with the gaps 102 in the chamber bottom wall and can thus pass between the series of panels that make up the three sections of the bottom wall.

To prevent the bridge pieces 104 of the chamber blocking the loading movement, each pair of jacks is momentarily contracted as a bridge piece approaches the support pins of those jacks and the support pins are raised again to re-engage the slab when clear of the bridge piece. The spacings of the bridge pieces and the jacks are so arranged that, during this sequence, there are always at least two pairs of jacks supporting the weight of the slab stably.

These separate movements of the pairs of jacks can be controlled automatically by the use of photocells and/or limit switches. In FIGS. 14 and 15 a photocell system is illustrated comprising a plate 122 fixed to the chamber 92 and co-operating with fixed position photocells 124, each associated with a respective pair of jacks, to initiate the movement of the jacks, the length of the plate being equal to the pitch of the photocells.

With the slab positioned within the chamber, all the jacks are contracted, the end doors 108 are closed and the chamber with its enclosed slab can be returned along the roller table 112 to an unloading transfer station (not shown), where a similar lifting jack arrangement removes the slab for further processing.

The opening of the end doors on arrival at a transfer station and their closure on leaving the station can be carried out automatically by means of a trip mechanism illustrated in FIG. 14, where the two doors are shown interconnected by a linkage comprising levers 132 fixed to the doors, a crank arm 134 mounted at its centre at a pivot fixed at the middle of the length of the chamber, and links 136 connecting respective ends of the crank to the two door levers. The linkage thus ensures that the two doors pivot jointly in opposite directions so that they are opened and closed together. Each door is provided with a trip-lever 140 that can be pivoted by stationary striker plates 142. As the chamber moves along the roller conveyor to enter a loading or unloading station, it reaches a striker plate, so that both doors are swung open and are maintained open until the chamber moves away from the station and trip levers are no longer engaged by the striker plate. It is of course possible to arrange that each door is operated independently of the other by a similar mechanism, if required.

FIG. 17 illustrates an alternative installation according to the invention which does not rely on conventional roller tables and can therefore be provided in a plant built from new to obviate the need to install roller tables as conveying means on which to transfer billets or slabs, e.g. from a continuous casting plant to a finishing mill.

The displaceable chamber 144 in this example is mounted integrally on a rail car 146 movable along rails 148 between loading and unloading transfer stations 150, 152 which are shown adjacent successive roll stands 154. The rail car 146 itself embodies a roller table section 156 and mounted below this on the car base frame are the lifting jacks 158 of a slab lifter that can be of an analogous form to the fixed transfer station slab lifter already described, the slab lifter here comprising support pins 160 analogous to the pins 120 that can project between the rollers of the table section 156. The chamber bottom wall comprises a series of heat-insulating panels 162 disposed between adjacent rollers with front and rear faces inclined towards the adjacent rollers so as to leave a minimum gap between the upper surfaces of each successive group of panels and shield the rollers from heat. These panels are themselves attached to the lifting jacks 158 to be raised and lowered with the support pins 160 that project above them.

In use, a slab S is run into the chamber from a fixed roller table 164 at the loading station 150 by driving the rollers and also the rollers of the table within the chamber, these two tables being at the same height. The slab is centralised inside the chamber with the aid of optical pyrometers (not shown) or other means. When the slab is in position the slab lifter raises it on the support pins 160 clear of the roller table section 156 and the bottom insulating panels 162 rise with the slab. The slab is lifted until its ends are at the level of vertical end panels 166 depending from the top wall of the chamber which cooperate with the bottom panels 162 effectively to seal the chamber except for the narrower gaps over the rollers between successive groups of the bottom panels.

The rail car carrying the insulating chamber with its slab is then run along the rails leading to the unloading station 152 where the slab is again lowered onto the roller table section 156 within the chamber and is run onto a discharge roller table 168. The rail car can be driven using self-contained wheel and motor assemblies mounted on its frame, or it can be pulled or pushed by external drive means, e.g. a cable reeling system.

If the distance to be travelled is large, FIG. 18 illustrates how two or more displaceable chambers 144 of the form shown in FIG. 17 can be used with a static transfer chamber 170 of similar construction providing an intermediate hold position between successive displaceable chambers. In this way a larger throughput of material can be achieved, and the intervals during which a chamber is empty are reduced, so reducing heat losses from the slabs. FIG. 19 illustrates the rail cars of FIGS. 17 and 18, optionally provided with the strings 20 of insulating elements that function in the manner described in preceding examples.

FIGS. 20 to 22 illustrate some further modifications within the scope of the present invention. These show a chamber, which may be fixed or displaceable, providing a heat-insulating walled enclosure, with a bottom wall construction comprising a roller table section 156 as in FIGS. 17 and 18, and a series of panels or groups of panels 172 mounted on pivot arms 174, conveniently centred on the axes 176 of the rollers of the roller table section. In the spaces between successive rollers transverse lifting bars 178 are interposed between adjacent panels or groups or panels, these bars extending between support beams 180 that lie on each side of the chamber with the roller table section and the bottom panels between them.

When a slab is to enter or leave the chamber, the bottom panels 172 are tilted to the inclined position shown in FIG. 21, in which they lie below the roller table section and the inclined top faces of the panel form chutes down which any loose mill scale deposited on them from the slab will be discharged, clear of the chamber. When the slab S is positioned in the chamber, the slab lifting mechanism operates and the support beams are raised, the lifting bars 178 now taking the weight of the slab and lifting it clear of the rollers. The beams 180 also have a series of transversely extending pins 182 secured to them to project into elongate slots 184 in the pivot levers of the bottom panels. As the lifting bars rise, therefore, the bottom panels also pivot upwards to form a substantially continuous insulating floor underneath but spaced from the slab in the fully raised position shown in FIG. 20. Preferably, the final panel 172a at the or each end through which a slab is to be passed has an angled cross-section so that it forms at least a portion of an end wall enclosure when the bottom panels are thus raised. FIGS. 19 and 20 show alternative cover or hood constructions, the left-hand half of each figure having the thin-walled panels referred to above as the only insulation, while the right-hand half shows shallower insulating panels supplemented with screens of insulating strings 20.

Figure 23:
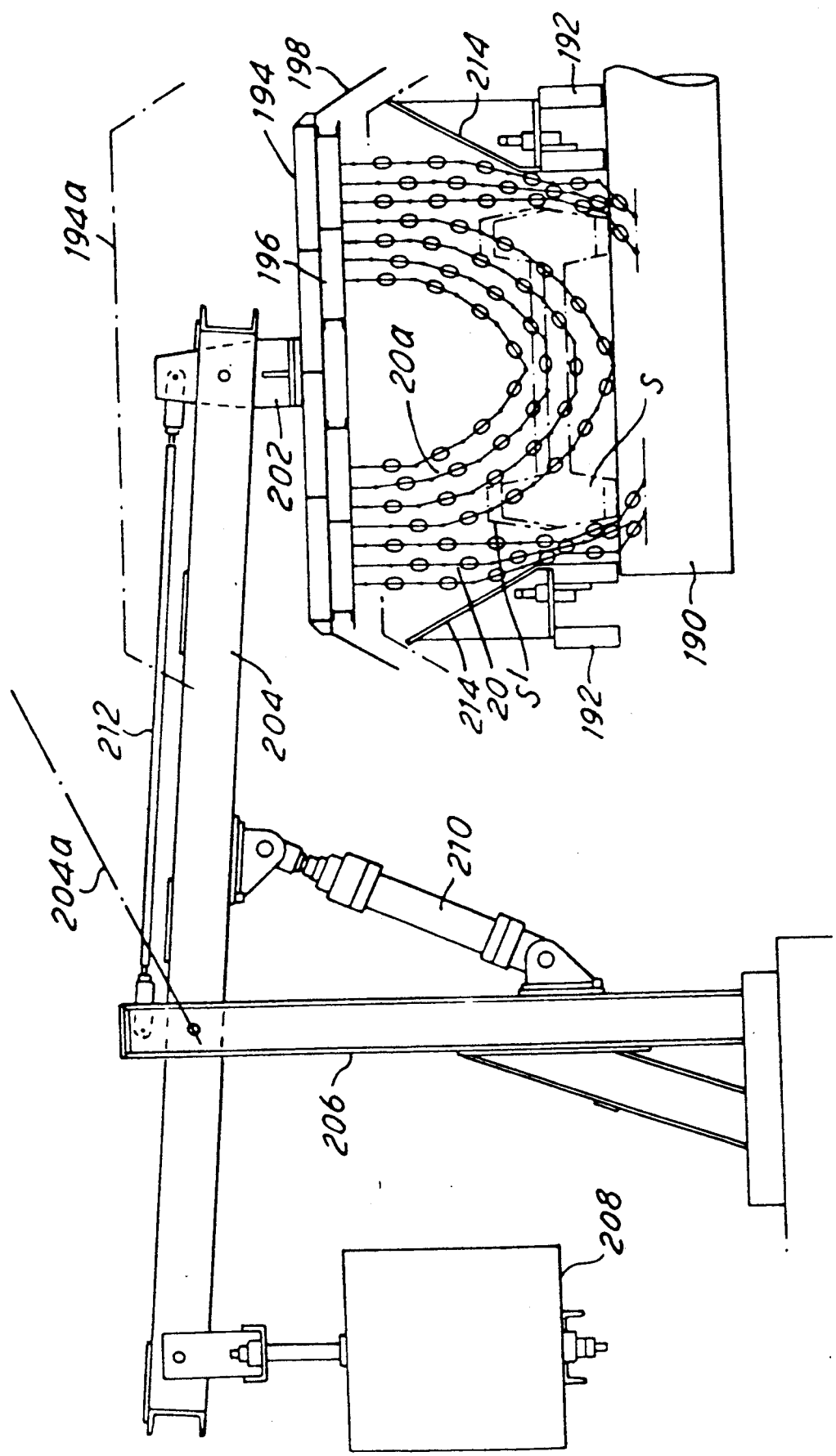
FIG. 23 shows a modification of the chamber that appears in the installations of FIGS. 17 and 18.

In the construction shown in FIG. 23, a heat-insulating enclosure according to the invention is provided on an existing roller table 190, of which side rails 192 are also shown. The enclosure comprises a top cover or hood 194 composed of heat-insulating panels 196 of the kind previously referred to, and sloping side shields 198 that project beyond the rails 192. Suspended from substantially the entire inner face of the top cover panels are strings 20 of heat-insulating elements, e.g. of the form described with reference to FIGS. 8 and 8a, to cover and curtain hot material S on the roller table. Lifting means with insulating panels are provided. These are not shown but they may be of the form already described, are able to lift the material from the roller table to the raised position S' indicated in broken lines.

In the outer lateral regions of the screen, the strings of elements are attached at one end to the top cover to depend vertically when they hang free of the table and the hot material. In the main central region the strings are supported from both ends so as to hang in catenaries 20a that extend laterally over this region. For simplicity of illustration only a few strings are shown in the drawing but it will be understood that the elements will be packed as closely as is permitted by the freedom of movement required of the strings to completely curtain the ends of the enclosure as well as to cover the material within it, and if the elements are finned they will be suspended in such a way that the fins contribute to the screening effect.

Fixed to the top cover 194 are suspension lugs 202 through which it is mounted from the series of cantilever beams 204 spaced along its length and supported on pillars 206 with counterweights 208 on their ends projecting past the pillars. Jacks 210 between the beams and the pillars can pivot the beams to a maximum lifted position illustrated by the phantom line 204a when the top cover is to be lifted clear of the table to the uppermost position 194a. A link arm 212 extends parallel to each beam and is pivoted at its ends to the corresponding lug 202 and pillar 206 at centres with the same spacing as the pivot centres of the beam. As the beams pivot upwards and downwards, therefore, the link arms 212 maintain the top cover horizontal.

When the top cover is lowered, guide plates 214 mounted on the table side rails 192 guide the outermost strings of insulating elements 200 so that they are grouped closely around the edges of the outer material of the table. The figure shows the top cover in a normal lowered position in which the side shields 198 on the top cover have slightly overlapped the vertical extent of the guide plates 214. It is possible to lower the top cover further to a position in which the guide plates and side shields abut, as is shown in broken lines.

It will be understood without further illustration that many of the individual features described can be employed interchangeably in other embodiments than those in which they are shown.

We claim:

1. A chamber comprising:
    bottom, top and side walls which are heat insulating and form a heat insulating enclosure for controlling heat loss from a hot material within said enclosure, said enclosure being provided with an opening at least at one end and with means, comprising at least one thin-walled heat insulating panel, for substantially closing said at least one end to limit heat loss from the interior of the enclosure therethrough;
    displacement means for displacement of said at least one heat insulating panel, whereby said panel provides a closure for said at least one end of the chamber; and
    support means extending downwardly below said heat-insulating bottom wall to form bearer means for supporting the weight of the chamber on a travel surface, and a plurality of elements extending upwardly into said enclosure to project above said bottom wall for support of said hot material within the enclosure.

2. A chamber according to claim 1 wherein at least one slot is provided in the bottom wall of the chamber, said slot extending away from said at least one end, and further comprising further support means arranged for displacement relative to the chamber along said at least one slot to transfer the hot material into and out of the chamber.

3. An installation comprising at least one chamber according to claim 1 and wherein there are provided loading and unloading stations with respective means for supporting the hot material out of the chamber, and means for displacing said chamber between said stations.

4. A chamber according to claim 1 wherein a panel in the form of a door hinged at its upper edge provides said closure for at said at least one end of the chamber.

5. A chamber according to claim 1 wherein said displacement means comprises a trip mechanism for opening and closing said closure, and means for operating said trip mechanism with a displacement of the chamber.

6. A chamber according to claim 1 wherein said elements of the support means have a thickness in a horizontal direction substantially smaller than a height in the vertical direction.

7. A material handling system comprising a displaceable chamber forming a heat insulating enclosure for controlling heat loss from a heated material, said enclosure comprising bottom, top and side walls which are heat insulating, the chamber being provided with an opening at least at one end thereof and with means for closing said at least one end to limit heat loss from the interior of the chamber therethrough, support means in a lower region of the chamber raised from said insulating bottom wall to support the material in the chamber, means for inserting and removing said material through said at least one end of the chamber comprising a series of upwardly projecting support members, means for relative horizontal displacement between the chamber and the support members in a direction transverse to said opening, a plurality of parallel slots in the chamber bottom wall extending from said opening to receive the support members during said relative displacement, means for causing a relative vertical displacement between the support members and the chamber, whereby support of the heated mass of material is transferred between the chamber and the support members by said relative vertical displacement and said material can be moved into and out of the chamber by said relative horizontal displacement while the material is supported by said support members.

8. An installation for transporting a heated material, comprising a rail car movable between loading and unloading transfer stations for said heated material, said rail car comprising a chamber forming a heat-insulating enclosure for the material, said enclosure having bottom, side and top walls of thermally insulating panels and having displaceable thermally insulating means at opposite ends thereof for permitting insertion and removal of the material into and from the chamber, said chamber having a roller table for supporting the material within the enclosure during its insertion into and removal from the chamber and means for lifting material in the enclosure above said roller table, said thermally insulating bottom wall comprising a plurality of panels and displacement means being connected to said panels for moving them to a position shielding the rollers of the roller table from heat radiated by the material when the material is lifted from the roller table.

9. An installation according to claim 8 wherein said means for lifting material comprises a plurality of laterally extending beams, displaceable in the chamber to lift the material from said bottom wall thereof.

10. An installation according to claim 8 wherein the roller table of said chamber comprises a series of rollers mounted on parallel axes and pivot axes are provided parallel to the roller axes, said bottom wall panels being displaceable on said pivot axes, the lifting means being disposed between the panels, said panels and lifting means being so arranged that when the material is raised on its lifting means the panels can be pivoted to a raised position in which they form a heat insulating floor between the roller table and the material.

11. An installation according to claim 10 wherein the panels of said chamber comprise at least one end panel with an angled cross-section arranged to form at least a portion of an end wall enclosure when said panels are raised.

12. An installation according to claim 8 wherein said displaceable thermally insulating means comprises at least one thin-walled heat insulating panel, and further comprising displacement means for displacement of said panel whereby the panel provides a closer for said at least one end of the chamber.

13. A displaceable chamber comprising walls provided with heat insulating material for forming a heat-insulating enclosure to control radiation heat loss from a mass of hot material within the enclosure, a roller table provided in the chamber for supporting material during its insertion into and removal from the chamber, first support means of the chamber below said enclosure providing load-bearing support for the displacement of the chamber, second support means within the chamber, providing a support for the material that is an alternative to a support of said roller table, said second support means acting to lift the material from said roller table, an opening at least at one end of the chamber for the insertion and removal of material through said one end into and from said enclosure, said opening extending substantially the internal height of the enclosure from said support plane, displaceable closure means for substantially closing said at least one end to limit heat loss therethrough after the insertion of the material, and an insulating bottom wall of the chamber being disposed below said second support means such that said second means supports the material in said enclosure spaced from the bottom wall.

14. A displaceable chamber according to claim 13 in the form of a rail car movable between loading and unloading transfer stations a wheeled chassis of said rail car forming said first support means.

15. A chamber according to claim 13 wherein at least one slot is provided in the bottom wall of the chamber, said slot extending away from said at least one end, and third support means are arranged for displacement relative to the chamber along said at least one slot for transfer of the material into and out of the chamber.

16. A chamber according to claim 15 wherein said third support means comprises a series of lifting members at a fixed station to and from which said chamber is displaceable, said members being arranged in at least one row corresponding in position to said at least one slot to be received therein as the chamber is moved into said station to receive and/or deposit the material.

* * * * *